Aug. 3, 1965  T. J. DANFORD  3,197,948
HITCH STRUCTURE FOR MOUNTING A ROTARY MOWER LATERALLY OFFSET
TO ONE SIDE OF A TRACTOR
Filed April 19, 1962  5 Sheets-Sheet 3

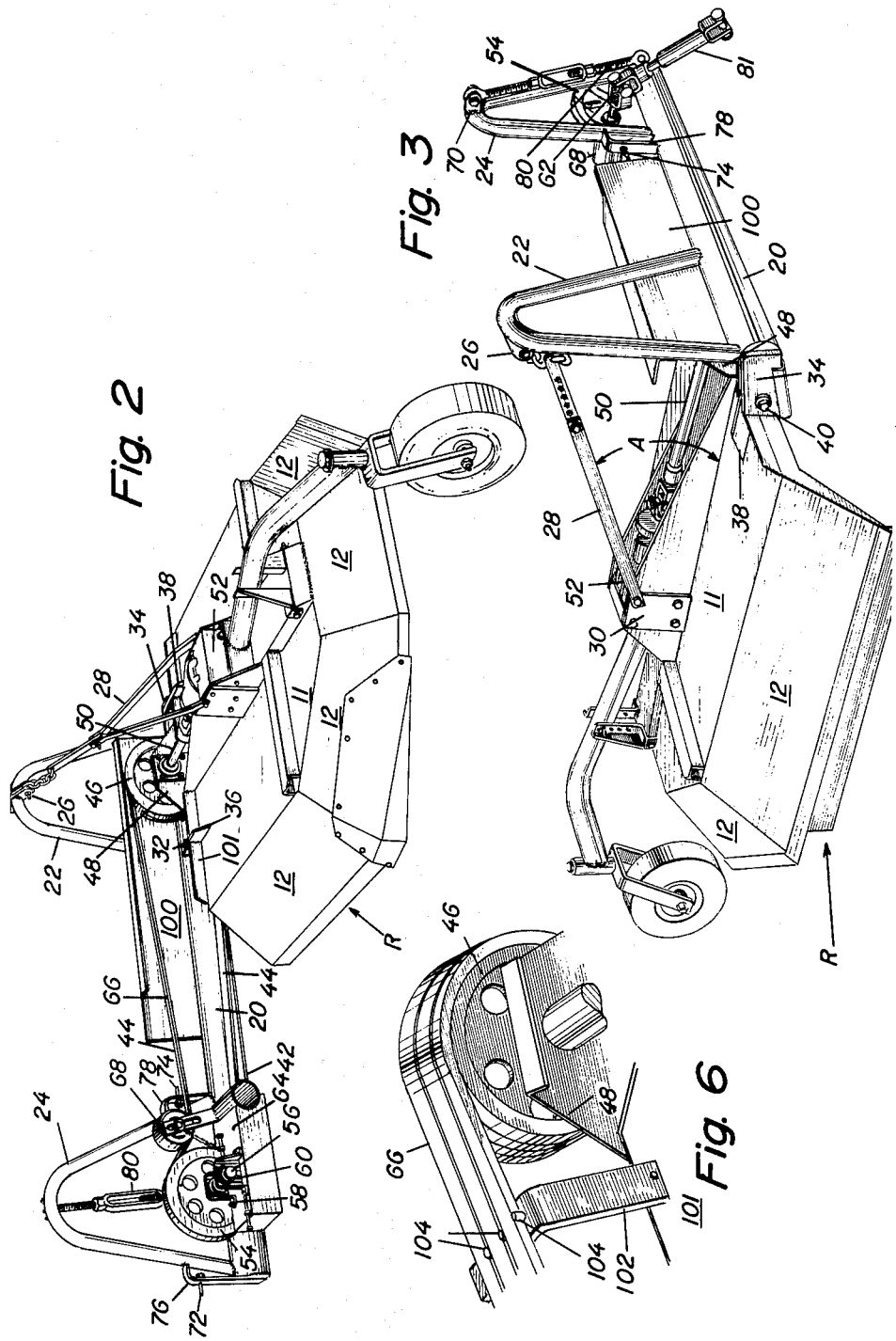

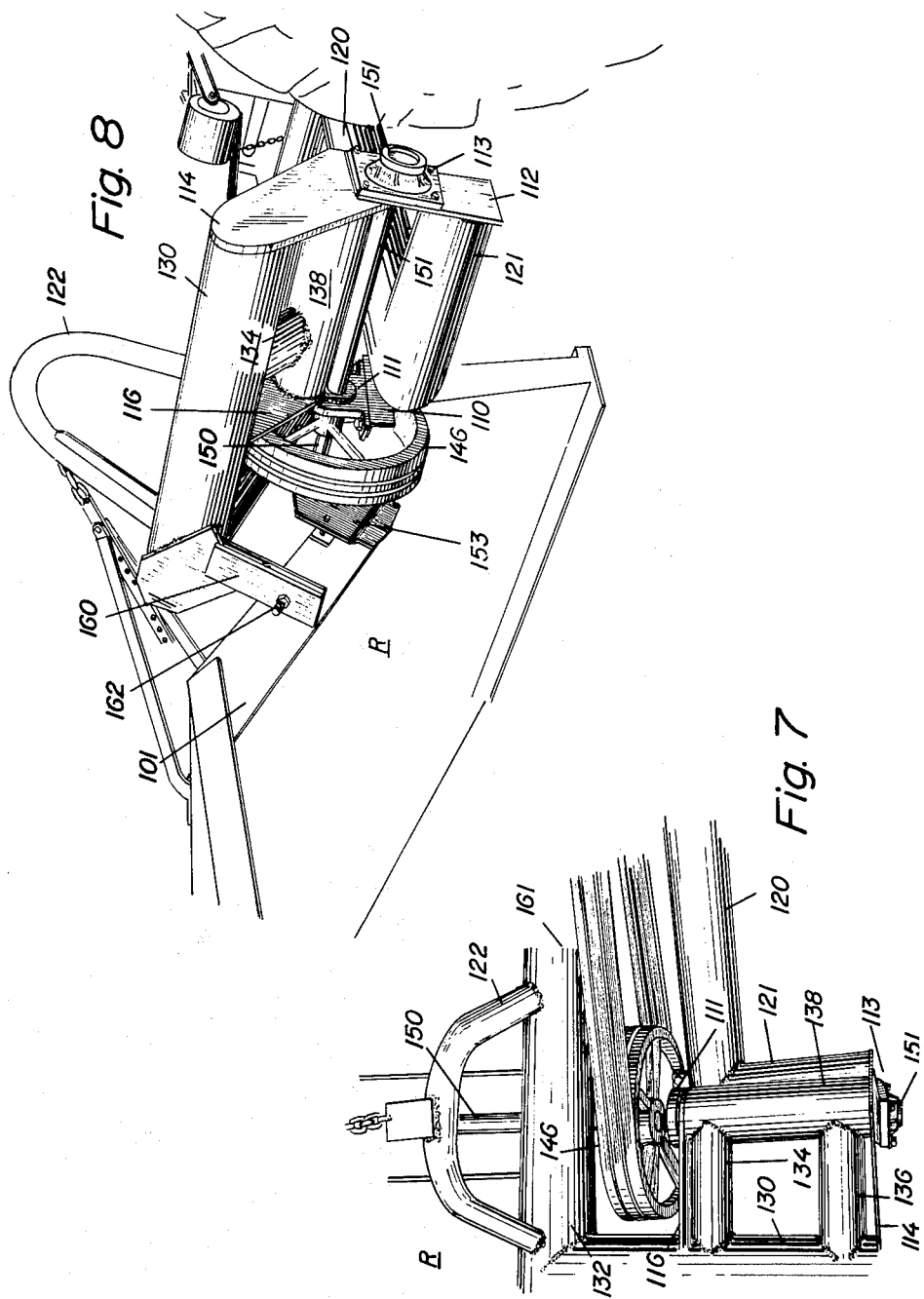

United States Patent Office 3,197,948
Patented Aug. 3, 1965

3,197,948
HITCH STRUCTURE FOR MOUNTING A ROTARY MOWER LATERALLY OFFSET TO ONE SIDE OF A TRACTOR
Tiras J. Danford, Rocky Mount, N.C., assignor to Harrington Manufacturing Company, Inc., Lewiston, N.C., a company of North Carolina
Filed Apr. 19, 1962, Ser. No. 188,670
9 Claims. (Cl. 56—25.4)

This invention generally pertains to an improved mobile brush and foliage cutting implement. More specifically this invention relates to a tractor-rotary cutter combination wherein the rotary cutter is mounted and operated to the rear of the tractor in a laterally offset position. In one particular embodiment this invention pertains to a tractor drawn rotary cutter which is particularly adapted to operate along the inclined banks of ditches, streams, etc. and under the low hanging branches of trees.

*The prior art rotary cutters, their advantages and disadvantages*

Rotary cutters which are adapted to be drawn behind tractors are well known and extensively used by farmers. Their popularity primarily stems from their rugged nature and their ability to chop and disintegrate a wide variety of items such as brush, bushes, small trees, weeds, vines, briars, honeysuckle, cornstalks, etc. Farmers primarily use rotary cutters for cleaning, stalk cutting and land clearing functions.

However, the conventional rotary cutters which are designed to be drawn *directly behind* a tractor suffer from several disadvantages and limitations. First of all, when a farmer tries to clear an area containing small trees having trunks between 1 and 3 inches in diameter the farmer must first run his tractor over the trees before the rotary cutter can operate on them. This frequently results in damage to the front portion of the tractor and particularly to the radiator and undercarriage of the tractor. Small tree trunks have considerable resiliency and "rebound" tendencies and even though a farmer may be able to push them over with his tractor, the "rebound" force which a bent-over tree trunk and its broken branches can exert in order to return to an upright position can be sufficiently great to puncture holes in the radiator of the tractor or bend the less rugged portions of the tractor undercarriage. There is the additional danger that a small tree bent over by the front end of the tractor may spring upward and harm the driver of the tractor. Small trees which break off when a tractor passes over them are also frequently dangerous when the remaining stump portion of the tree is between one and three feet high— because such stumps can damage the tractor radiator and undercarriage before the rotary cutter gets a chance to reduce the stumps to ground level.

A second severe limitation of rotary cutters drawn *directly behind* tractors is that the rotary cutter can only go where the tractor goes. This means that farmers cannot use their rotary cutters on brush and small trees growing in gulleys or narrow drainage ditches because tractors usually cannot be driven in drainage ditches or on slopes having a substantial incline. Since nearly every large farm acreage includes some drainage ditches or small streams with banks so steep that a tractor cannot traverse them this means that the farmer is forced to permit unsightly and wasteful brush areas to thrive. This is particularly disadvantageous to dairy farmers since it frequently limits a herd's access to small streams of water and also cuts down on the grazing area adjacent to streams.

A third disadvantage of rotary cutters drawn *directly behind* tractors is that they frequently cannot operate as close as desired to fence lines, large rocks and trees with low hanging branches. Again, since the rotary cutter can only go where the tractor can go, whenever the slope adjacent fence lines or low hanging branches will not accommodate the tractor and its driver, then the rotary cutter cannot operate.

A fourth disadvantage of rotary cutters drawn *directly behind* tractors is that if the farmer is cutting certain types of grass areas, the large rear tires of the tractor and the smaller tractor front tires will frequently mash the grass down to such an extent that it stays mashed down until the rotary cutter passes over it, whereafter it springs up to its original height. This results in fields which end up only partially cut.

It is therefore a primary object of the present invention to provide a tractor mounted rotary cutter that is especially adapted for use in cutting brush and foliage in areas where it would be disadvantageous or impossible for a tractor to operate.

A more specific object of the present invention is to provide a tractor attached rotary cutter that is especially adapted for use in clearing brush and foliage from the sides of banks, ditches, gulleys and streams, and from underneath the low branches of trees and adjacent to fences, hedge rows, etc.

Another important object of the instant invention is to provide a rotary cutter that may be quickly and easily attached to a tractor alongside thereof and at the same time easily and effectively coupled with the power take-off of the tractor at the rear of the latter to drive the rotary cutter.

A further object of the present invention is to provide a laterally displaced rotary cutter for mounting behind a tractor so that the rotary cutter does not adversely affect or limit the maneuverability of the tractor.

A further object of the present invention is to provide a novel coupling means between the tractor and the lateral support means for the rotary cutter so that the angularity of the rotary cutter with respect to the tractor can be adjusted as desired.

Another object of the invention is to provide a tractor-cutter combination which will permit the cutter element to act upon foliage before the wheels of the tractor have run over it.

The above specific objects as well as other objects and advantages will become more apparent to those skilled in the art after reading the following detailed description taken in conjunction with the attached sheets of drawing on which, by way of preferred example only, is illustrated one embodiment of this invention.

Referring now to the drawings:

FIGURE 2 is a perspective view of the lateral supporting means and rotary cutter when viewed from the rear and above;

FIGURE 3 is a perspective front-top view of the rotary cutter and lateral supporting means shown in FIGURE 2;

FIGURE 6 is a fragmentary perspective view showing an alternative belt mounting arrangement in accordance with this invention;

FIGURES 7 and 8 are fragmentary perspective views illustrating a second embodiment of the invention relating to the manner in which the rotary cutter housing is pivotally mounted with respect to the lateral supporting means;

Before explaining the present invention in detail, it is to be understood that the invention is not limited in its application to the details of construction and arrangement of parts illustrated in the embodiments of the accompanying drawings since the invention is capable of other embodiments and of being practiced or carried out in various ways. Also it is to be understood that the phraseology or terminology employed herein is for the purpose of description and not of limitation.

The invention generally

Figure 1:
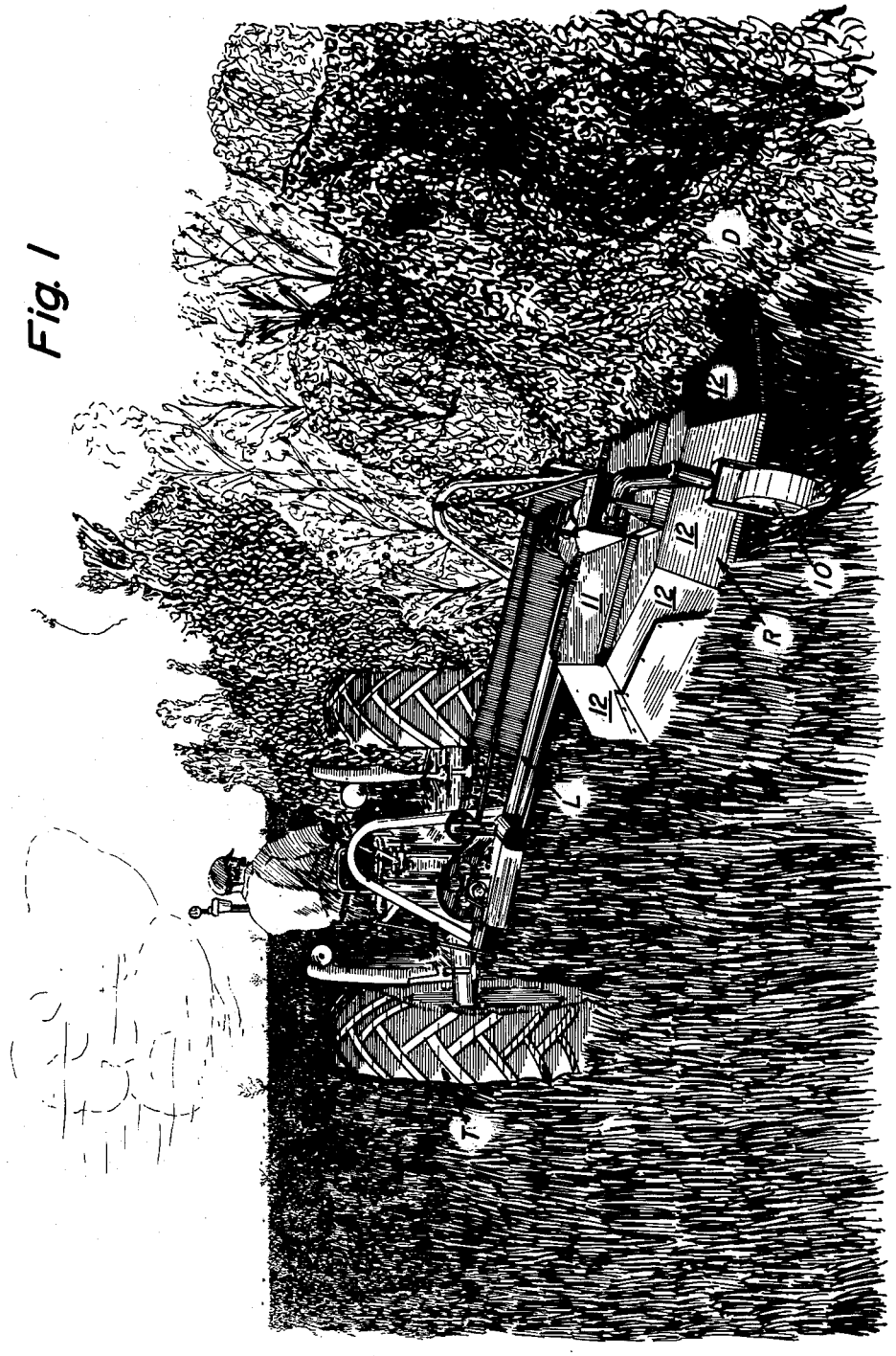
FIGURE 1 is a rear perspective view of a tractor and offset rotary cutter illustrating how the mounting of the rotary cutter of this invention permits one to effectively operate upon brush and foliage in inclined ditches.

Referring now to FIGURE 1, there is shown a rear perspective view of a tractor mounted with the subject matter of this invention. The tractor is generally designated by T; the rotary cutter is generally designated by R; and the tractor-cutter interconnecting means between the tractor T and the rotary current R is generally designated as L. In this view it will be seen that the tractor T is moving along the edge of an inclined overgrown ditch area D and that by virtue of the construction of the tractor-cutter interconnecting means L, as more specifically described hereinafter, the rotary cutter R is permitted to generally conform to the inclination of the banks of the ditch and to thereby closely cut the scrubs and vegetation growing in the ditch. All of this is accomplished with the tractor moving in a relatively level plane with no danger of the tractor driver being displaced from his seat and no danger of the tractor either turning over or having its wheels mired in the ditch. Furthermore, this arrangement permits the tractor itself to largely avoid contact with the heavy brush and therefore damage to the tractor radiator or undercarriage is minimized. It will be noted that the plane of the rotary cutter is displaced from the plane of the tractor by an angle of between about 10 and 30 degrees. Since nearly every field area is bordered or crossed with at least one drainage ditch which is frequently overgrown with heavy brush and young trees, the great utility of the present invention will be quite apparent. The details of the arrangement shown in FIGURE 1 are presented in FIGURES 2–5.

The rotary cutter

The novel rotary cutter comprises a driven rotary blade, an enclosure partially surrounding the top and sides of said rotary blade, means 10 for supporting the cutter a desired distance above the ground, and the particular improvement involves the fact that the enclosure contains a substantially flat top cover portion 11 disposed in a plane approximately parallel to the ground and outwardly downwardly flared skirts 12 depending from the outer periphery of a substantial proportion of said top cover portion at an angle between about 120° and 150° with respect to the bottom side of the top cover portion 11. The rotary cutter of this invention has a cover or deck structure which is relatively vibration-free and which is more rigid than prior art rotary cutters—requiring less structural bracing and consequently less over-all weight. The light weight of the rotary cutter makes it possible to use a single elongated torsion member. With many other heavier types of prior art rotary cutters this is not practical. Furthermore, since this type of rotary cutter has flared skirts it provides better protection to the tractor driver and to nearby personnel since it tends to deflect debris downwardly rather than outwardly.

However, other shapes and designs of rotary cutter housings could be used in place of the specific embodiment shown.

The tractor-cutter interconnecting means

Figure 4:
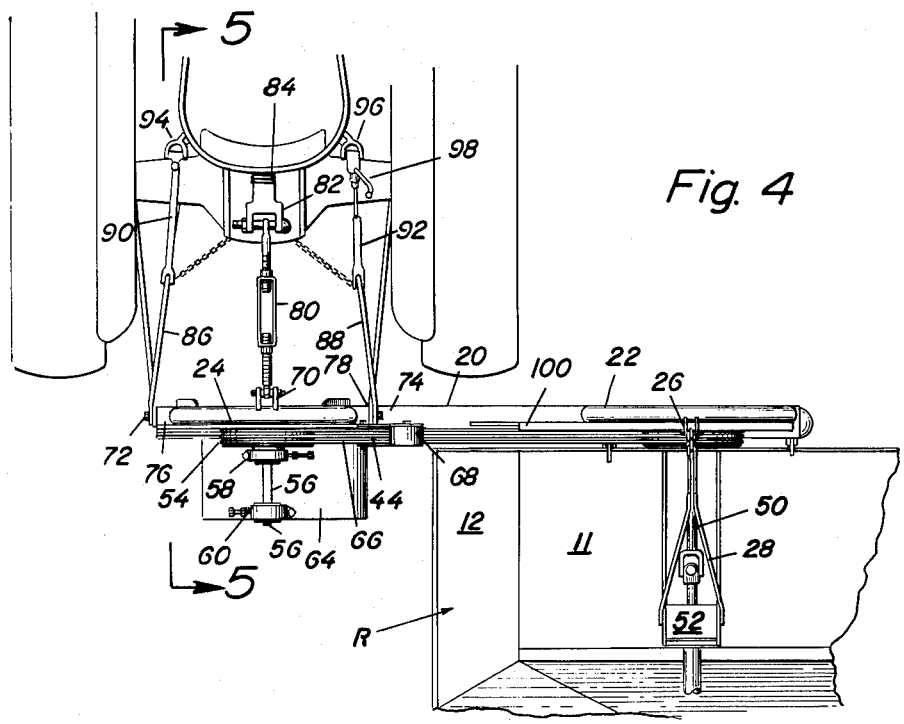
FIGURE 4 is a fragmentary plan view illustrating the manner in which the lateral supporting means of this invention are connected to a tractor.

As can perhaps best be seen in FIGURES 2, 3 and 4, the primary component of the tractor-cutter interconnecting means is the elongated torsion member 20, which as shown simply consists of a length of 4 inch pipe (although pipe of larger or smaller diameter could be used). The torsion member could just as well be a square tube or other equivalent structure so long as it had strength enough to laterally support the rotary cutter in the manner to be described hereinafter. (Those skilled in this art will recognize the engineering equivalents of the 4 inch pipe.)

As shown, two inverted U-shaped members 22 and 24 are welded adjacent opposite upper ends of the elongated torsion member 20. The upper rear portion of inverted U-shaped member 22 is provided with an attachment lug 26 or equivalent device which will permit the attachment of a hitch member 28 to an intermediate portion 30 on the top of the rotary cutter. The angle A for the hitch member 28 may vary between 0 and 60°, which would of course depend upon the height of inverted U-shaped member 22.

The same end of the elongated torsion member 20 to which inverted U-shaped member 22 is welded, is also provided with two laterally spaced and rearwardly extending rotary cutter attachment means 32 and 34. As shown, each of these cutter attachment means 32 and 34 can merely consist of two rearwardly extending bracket sections having aligned holes therein which are adapted to receive corresponding connecting projections 36 and 38 located on the forward upper end of the rotary cutter housing R. When a bolt 40 is inserted through the aligned holes in 34 and 38 and then fastened tightly with a nut 40 a rigid connection is formed.

Adjacent the bottom of the torsion member 20 there is located a rearwardly extending substantially flat shelf member 42 (see FIGURE 2) which is preferably disposed essentially parallel to the ground. One function of this shelf member 42 is to provide at least limited protection for the lower portion of belt 44. A pulley 46 is disposed above the shelf member 42 and is held in position there by a mounting bracket 48. Mounting bracket 48 is fastened to the upper front portion of the rotary cutter R by bolts or welding and supports the drive shaft 50 which interconnects the pulley 46 with the gear box 52. The gear box 52 drives the blades of the rotary cutter.

Another pulley 54 is located on the opposite end of the torsion member 20. A shaft extends through the center of pulley 54 and consists of a back portion 56 mounted for rotation between bearing brackets 58 and 60, and a front portion 62 (see FIGURE 3) which is adapted to be coupled to the power take-off means 81 of a tractor. The bearing brackets 58 and 60 are shown as being supported upon a base member 64, this base member 64 being secured (as by welding) to the rear side of elongated torsion member 20.

One or more belts 66 pass over and around pulleys 46 and 54, and spring tensioned idler pulley insures that there will be proper tension on the belt 66. (No invention would of course be involved in using a chain and sprocket arrangement or other equivalent drive means instead of a belt and pulley.)

A shield member 100 is preferably welded or otherwise attached to the elongated torsion member 20 so as to serve as a protective guard for the pulley 46 and belt 66 against the tearing action which might otherwise be encountered when the rotary cutter is moved through and over thick brush, foliage and small trees.

FIGURE 6 is a fragmentary perspective view illustrating a worthwhile feature useful in conjunction with the present invention. In this view a portion of the belt arrangement 66 which passes around pulley 46 is shown on an enlarged scale. The belt arrangement 66 is seen to actually consist of three separate belts fitting into corresponding grooves in pulley 46. A belt guide means in the form of an L-shaped member 102 and three pins 104 is provided so that the pins 104 serve to keep the three belts the desired distance apart and guided so that they will remain in the proper grooves in the pulley 46. The belt guide means prevents the various belts from getting crossed or fouled with one another. The L-shaped member 106 may be suitably bolted to the top portion 101 of the rotary cutter housing R.

*The power take-off and leveling means*

The inverted U-shaped member 24 near the end of elongated torsion member 20 nearest the tractor primarily serves as a means for connecting the torsion member 20 to the tractor. This inverted U-shaped member 24 has one attachment lug 70 near its top and two additional connection means 72 and 74 on each of its lower sides. The two additional connection means 72 and 74 are preferably mounted in the inverted L-shaped brackets 76 and 78.

Figure 5:
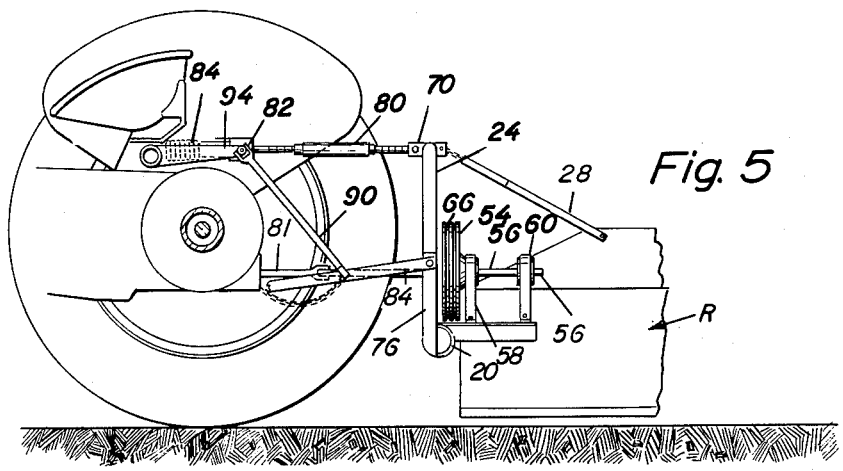
FIGURE 5 is a fragmentary view along line 5—5 of FIGURE 4.

The implement hitch linkage is perhaps most clearly shown in FIGURES 4 and 5 and is seen to comprise a top link 80 pivotally secured at its forward end to a yoke 82 which is in turn connected to a portion of the tractor under the tractor seat by means of a heavy spring 84.

The connector means 72 and 74 are pivotally connected to a pair of trailing laterally spaced draft links 86 and 88, and links 86 and 88 are pivotally connected at their front ends to a portion of the tractor. Drop links 90 and 92 connect draft links 86 and 88 to lift arms 94 and 96 of a power operated lift mechanism. Linkage 92 is adjustable by virtue of crank screw adjusting means 98.

The construction of the power elevatable implement hitch linkage which is described in the preceding three paragraphs and which is generally indicated in FIGURES 4 and 5 is well known to the art and for that reason the precise details of construction of such arrangements will not be repeated here since they form no part of the present invention. Other and different types of power elevatable implement hitch linkages could be used, the essential requisite being that they be able to move the entire rotary cutter and lateral support means at least several inches (and preferably at least a foot) off the ground. Adjustability of at least one of the drop links is also necessary in order to permit the plane of the rotary cutter R to be inclined with respect to the plane of the tractor (e.g. in the manner shown in FIGURE 1). If means are not provided for permitting adjustment of the plane of the rotary cutter with respect to the plane of the tractor then it will not be possible to accomplish the cutting of the banks of gulleys, ditches, etc. with the implement shown in FIGURES 1–5.

An alternative embodiment of the invention is shown in FIGURES 7 and 8. The primary difference in the embodiment illustrated in these figures is that the rotary cutter is mounted in a more or less free swinging pivotal fashion so that it can be adjusted to cut on either downwardly inclined slopes or upwardly inclined slopes.

As can be seen in FIGURES 7 and 8, the rotary cutter R (which is substantially the same as the rotary cutter of FIGURES 1–5) is interconnected to the elongated torsion member 120. Torsion member 120 is the same as torsion member 20 insofar as the half of the torsion bar closest to the tractor is concerned and accordingly these details have not been repeated in FIGURES 7 and 8. However, the half of the torsion bar 120 which is farthest from the tractor is substantially different from that section of torsion member 20 shown in FIGURES 1–5. Specifically, it will be observed that the end of torsion bar 120 which is furthest from the tractor terminates a slight distance ahead of the pulley 146. A forward support member 121 is welded onto the outer terminal end of torsion bar 120 and support member 121 is seen to be approximately perpendicularly forward of the torsion bar 120. The upper rear portion of support member 121 is provided (e.g. as by welding) with a bearing bracket 110 and a bearing stanchion 112 is welded onto the upper front portion of support member 121. A shaft 151 is supported between spaced apart bearing mountings 111 and 113 and is freely rotatable therein. The portion of freely rotatable shaft 151 which is between bearing mountings 111 and 113 has welded to it spaced apart side support plates 114 and 116.

The opposite (outer) ends of plates 114 and 116 are joined to an L-shaped load transfer member comprising sections 130 and 132. Members 134, 136 and 138 are preferably used in order to provide additional rigidity and strength to the framework formed by members 114, 116, 130 and 151. At one end of section 132 and adjacent the corner formed by sections 130 and 132 it will be seen (see FIGURE 8) that a pair of downwardly depending attachment brackets 160 and 161 are provided (as by welding) and the lower ends of these brackets are attached (as by bolts and nuts 162) to the forwardly extending connections (not shown in detail) located on the upper front edge 101 of the rotary cutter housing R. Inverted U-shaped member 122 corresponds to member 22 shown in FIGURES 1–5.

As FIGURES 7 and 8 indicate, the pulley 146 and its shaft 150 will remain substantially stationary with respect to torsion member 120, that is in approximate axial alignment with shaft 151, but the rotary cutter housing R will be free to tilt in one direction or the other depending upon the contour of the ground being traversed. If the rotary cutter housing is considered as being disposed in an essentially horizontal plane when the unit is traveling over level land, then it will be seen that this horizontal plane will rotate to a limited extent with respect to the axial line defined by the drive shaft 150, the amount of rotation being dependent upon the contour of the ground being traversed. The unit shown in FIGURES 7 and 8 thus permits one to effectively use the rotary cutter on slopes which are inclined toward the tractor and slopes which are inclined away from the tractor. In fact, by elevating torsion member 120 upwards several feet by means of the hydraulic means associated with the tractor, one would even be able to cut with the rotary cutter housing R in a substantially vertical posture.

Since the construction shown in FIGURES 7 and 8 permits essentially free rotation of the rotary cutter housing R, if one should desire to do some cutting at a fixed angle to the horizontal, those skilled in the art will appreciate that numerous ways might be devised for maintaining such a fixed angular disposition. For example, a chain having one end anchored to either the near side or the far side of the rotary housing R and having its other end adjustably connected to a point adjacent the operator might suffice. Alternatively an elongated rod extending between the same two approximate points (and adjustable by the operator to various lengths) might be used.

Figure 9:
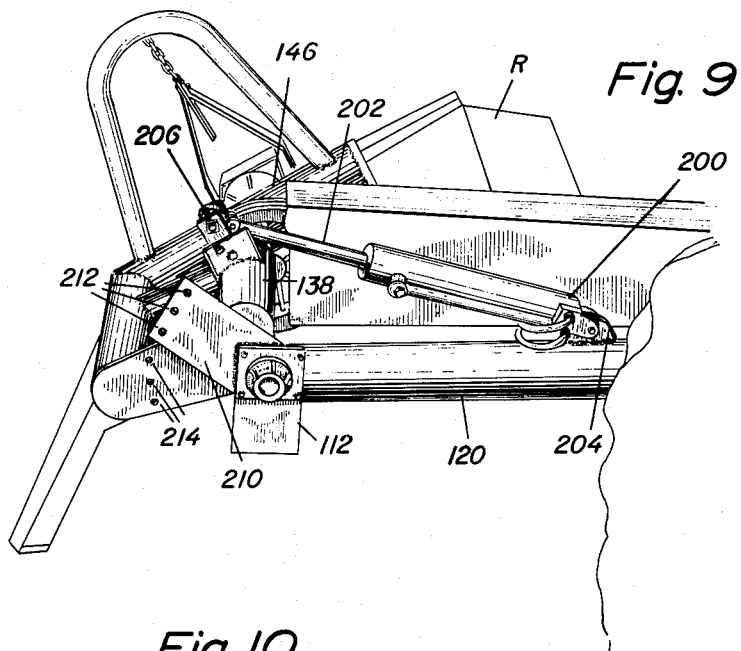
FIGURE 9 is a fragmentary perspective view of another embodiment of the invention which permits greater control over the angularity of the rotary cutter housing with respect to the ground.
Figure 10:
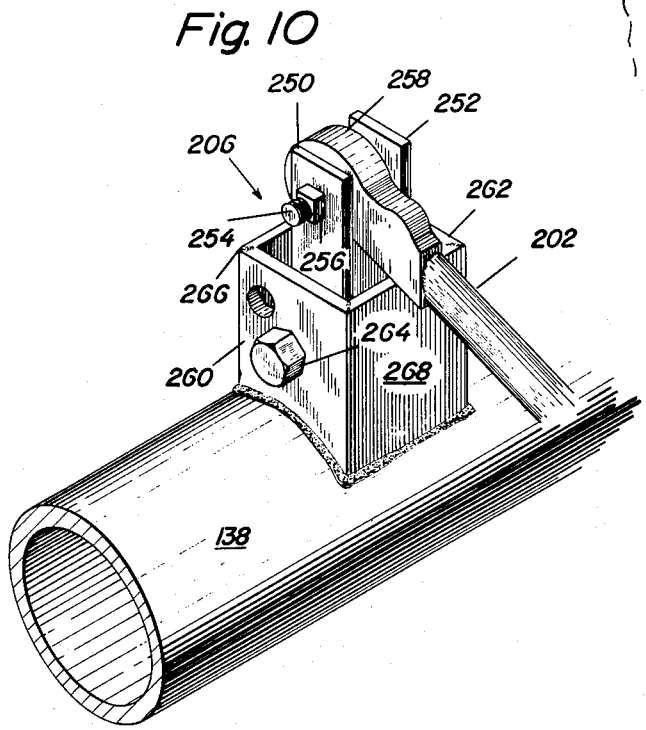
FIGURE 10 is an enlarged fragmentary perspective view of a bracket mounting arrangement shown in FIGURE 9.

A further embodiment of the invention is shown in FIGURES 9 and 10. FIGURE 9 shows a variation on the specific structure shown in FIGURES 7 and 8 which permits one to control the angularity of the rotary cutter housing R with respect to the ground or with respect to the elongated torsion member 120. This angularity control means is seen to consist of a hydraulically controlled piston unit connected between a fixed point on the torsion member 120 to a point on the pivotable member 138. The piston unit is seen to comprise a piston cylinder 200 and a piston arm 202. The right end of piston cylinder 200 is pivotally mounted in bracket 204, welded to member 120 and is supplied with suitable hoses for the hydraulic fluid, the flow of which can be controlled from a point adjacent the seat of the tractor driver. The left end of piston arm 202 is pivotally attached to a bracket arrangement 206 that is located on pivotable member 138. When piston arm 202 is extended its maximum distance to the left, the rotary cutter housing R will be tilted so as to cut inclined areas sloping downwardly and away from the tractor. When the piston arm 202 is in its rightmost position the rotary cutter housing R will be tilted so as to cut inclined areas sloping upwardly and away from the tractor.

FIGURE 9 also shows an arrangement wherein an angled extension plate 210 has been welded to stanchion 112 as a sort of continuation thereof. The extension plate 210 has a series of holes 212, preferably disposed in an arc near the outer end thereof. As the angularity of rotary cutter housing R changes as a result of the movement of piston arm 202, one or the other of holes 212 will come into registry with a similar sized hole 214 located in rotatable side plate 114. When these holes are in registry, a pin or bolt may be inserted therethrough and side plate cannot thereafter rotate, thus fixing the angular disposition of the rotary cutter housing.

FIGURE 10 is an enlarged fragmentary perspective view of the bracket arrangement 206 shown in FIGURE 9. In this view the piston arm 202 is shown as being mounted between two pivotable plates 250 and 252 by means of a bolt 254 and nut 256 passing through said plates and through a knob-like end 258 on the piston arm 202. Pivotable plates 250 and 252 are in turn mounted between two plates 260 and 262 welded on top of member 138. A bolt 264 passes through plates 264, 250, 252 and 262 and permits unitary pivoting of plates 250 and 252, but such pivoting is limited by side plates 266 and 268. However, this limited amount of pivoting action is desirable because it lends some flexibility to the movement of the rotary cutter housing which results in a limited "floating action" which permits the cutter housing to accommodate itself to relatively minor variations in the contour of the land being traversed.

*Advantages of invention*

The advantages of the present invention are many and the most important of these can be summarized as follows:

(1). It largely avoids damage to the radiator and undercarriage of a tractor by making it unnecessary for the tractor to pass over heavy brush and foliage in order for the rotary cutter to act upon it.

(2). It permits a rotary cutter to operate on the inclined slopes of banks, ditches, streams and the like where it would otherwise be difficult or impossible for a tractor to operate if the rotary cutter was located directly behind the tractor.

(3). It permits a rotary cutter to operate effectively on areas beneath the low hanging limbs of trees and adjacent to fences and rocks which it would otherwise be difficult or impossible to accomplish if the rotary cutter was located directly behind the tractor.

(4). The tractor-cutter interconnecting means is very simple in construction, utilizes readily available and inexpensive construction materials and is easy and inexpensive to fabricate.

(5). The use of a simple, inexpensive, easily fabricatable tractor-cutter interconnecting means is primarily made feasible because of the light-weight construction of the "turtleback" type of rotary cutter used.

(6). The elongated torsion member not only serves as a supporting means for the rotary cutter, but also facilitates effective operation of the rotary cutter because of the manner in which it initially contacts and bends over a large proportion of the brush and foliage which is to be acted upon by the rotary cutter.

(7). When cutting a field of tall thick grass, hay or grain, the present invention has the advantage that the uncut grass, hay or grain or windrows thereof will not be partially mashed down by the tractor wheels before it can be cut by the rotary cutter.

Other advantages of the invention will be apparent to those skilled in the art.

In conclusion while there have been illustrated and described some preferred embodiments of the invention, it is to be understood that since the various details of construction may obviously be varied considerably without really departing from the basic principles and teachings of this invention, I do not limit myself to the precise constructions herein disclosed and the right is specifically reserved to encompass all changes and modifications coming within the scope of the invention as defined in the appended claims.

It will also be appreciated that the offset torsion bar and power transmission means set forth have novelty per se and could well be used in connection with agricultural instruments other than rotary cutters.

Having thus described my invention, what I claim as new and desire to secure a United States Patent for is:

1. A cutting implement comprising in combination:
   (a) a tractor,
   (b) a rotary cutter,
   (c) a tractor-cutter interconnecting means which operatively interconnects said tractor and rotary cutter,
   (d) said tractor-cutter interconnecting means comprising:
      (1) an elongated torsion member having an inboard end and an outboard end and being normally disposed approximately parallel to the ground, but capable of being inclined with respect to the ground,
      (2) said inboard end being designed to be located directly behind the tractor,
      (3) said outboard end being designed to be located in an offset position to the side and rear of the tractor,
      (4) the inboard end of said torsion member having mounted thereon a mast-type hitch structure including an upstanding member extending vertically above said torsion member,
      (5) said upstanding member being provided with a plurality of attachment means which are adapted to be operatively connected to the tractor so that the entire tractor-cutter attachment means can be raised and lowered with respect to the ground,
      (6) the outboard end of said elongated torsion member being provided with a mast-type hitch structure including an upstanding member extending vertically above said torsion member, and with securing means for attachment to the rotary cutter in trailing relationship to the direction of travel,
      (7) the inboard end of said elongated torsion member additionally having mounted thereon a first pulley which is adapted to be driven by a power take-off means on said tractor,
      (8) a second pulley being disposed adjacent the outboard end of said elongated torsion member at a spaced distance from said first pulley,
      (9) at least one endless belt operatively interconnecting said first and second pulleys,
      (10) said second pulley also being operatively connected to the drive shaft of the rotary cutter.
   (e) the elongated torsion member of said tractor-cutter interconnecting means being disposed in advance of said rotary cutter so as to function as a strong rigid bumper for initially contacting and bending over brush and foliage in the path of the rotary cutter, thus facilitating effective operation of the rotary cutter.

2. The structure according to claim 1 wherein an elongated shield is attached to said elongated torsion member in front of said belt and said second pulley, whereby said belt and second pulley will be protected from damage by contact with brush and foliage.

3. In the known combination of a tractor, a rotary cutter located to the side and rear of the tractor and a tractor-cutter attachment means which both operatively connects said tractor and said rotary cutter and which can be raised and lowered by said tractor, the improvement in said tractor-cutter interconnecting means which comprises:

(a) an elongated torsion member having an inboard end and an outboard end and adapted to being disposed approximately parallel to the ground when traveling over level ground and being adapted to being inclined with respect to the ground when traveling over slopes, (b) said inboard end of said elongated torsion member being designed to be located directly behind the tractor, (c) said outboard end of said elongated torsion member being designed to be located in an offset position to the side and rear of the tractor, (d) the inboard end of said torsion member having mounted thereon a mast-type hitch structure including an upstanding member extending vertically above said elongated torsion member, (e) said upstanding member being provided with a plurality of attachment means which are adapted to be operatively connected to the tractor, (f) the outboard end of said elongated torsion member being provided with a mast-type hitch structure including an upstanding member extending vertically above said torsion member, and with securing means for attachment to a rotary cutter in trailing relationship to the direction of travel, (g) the inboard end of said elongated torsion member additionally having mounted thereon a first pulley which is adapted to be driven by the power take-off means of said tractor, (h) a second pulley being disposed adjacent the outboard end of said elongated torsion member at a spaced distance from said first pulley, (i) at least one endless belt operatively interconnecting said first and second pulleys, (j) said second pulley being operatively connected to the drive shaft of a rotary cutter, (k) the elongated torsion member of said tractor-cutter interconnecting means being disposed in advance of said rotary cutter so as to function as a strong rigid bumper for initially contacting and bending over brush and foliage in the path of the rotary cutter, thus facilitating effective operation of the rotary cutter.

4. The structure according to claim 3 wherein an elongated shield is attached to said elongated torsion member in front of said belt and said second pulley, whereby said belt and second pulley will be protected from damage by brush and foliage.

5. A structure according to claim 3 wherein the securing means on the outboard end of said elongated torsion member includes an elongated shaft which is generally horizontally disposed and rotatably mounted in bearings so that its axis is substantially perpendicular with respect to said elongated torsion member, a support framework being fixed to said elongated rotatable shaft, said support framework being also connected to said rotary cutter housing, whereby said rotary cutter housing can be rotated with respect to the axis of elongated rotatable shaft.

6. A structure according to claim 5 wherein a hydraulic piston arrangement is provided between said support framework and said elongated torsion member so that the angularity of the rotary cutter can be controlled with respect to said elongated torsion member.

7. In the known combination of a tractor, an agricultural implement located to the side and rear of the tractor and an interconnecting means which operatively connects said tractor and said agricultural implement, the improvement in said interconnecting means which comprises:

(a) an elongated torsion member having an inboard end and an outboard end and adapted to being disposed approximately parallel to the ground when traveling over level ground and adapted to being inclined with respect to the ground when traveling over slopes, (b) said inboard end of said elongated torsion member being designed to be located directly behind the tractor and having mounted thereon a mast-type hitch structure including an upstanding member extending vertically above said torsion member, (c) said outboard end of said elongated torsion member being designed to be located in an offset position to the side and rear of the tractor and having mounted thereon a mast-type hitch structure including an upstanding member extending vertically above said torsion member, (d) the inboard end of said elongated torsion member being provided with a plurality of attachment means which are adapted to be operatively connected to the tractor, (e) the outboard end of said elongated torsion member being provided with securing means for attachment to an agricultural implement, (f) the inboard end of said elongated torsion member having a first power transferring means which is adapted to be driven by the power take-off means of said tractor, (g) the outboard end of said elongated torsion member having a second power transferring means which is adapted to transmit power from said first power transferring means to said agricultural element, (h) the securing means on the outboard end of said elongated torsion member including an elongated shaft which is rotatably mounted in bearings so that its axis is substantially perpendicular with respect to said elongated torsion member, a support framework being fixed to said elongated rotatable shaft, said support framework being also connected to said rotary cutter housing, whereby said rotary cutter housing can be rotated with respect to the axis of elongated rotatable shaft.

8. An interconnecting means according to claim 7 which has a pivotal mounting arrangement on its inboard end which permits the outboard end of the interconnecting means to ride over irregular terrain with a floating action.

9. A structure according to claim 7 wherein a hydraulic piston arrangement is provided between said support framework and said elongated torsion member so that the angularity of the rotary cutter can be controlled with respect to said elongated torsion member.

References Cited by the Examiner

UNITED STATES PATENTS

| | | | |
|---|---|---|---|
| 2,720,740 | 10/55 | Price | 56—25.4 |
| 2,830,422 | 4/58 | Morkoski et al. | 56—25 |
| 2,877,618 | 3/59 | Thornton-Trump | 56—25.4 |
| 2,974,469 | 3/61 | Smith et al. | 56—25.4 |
| 3,003,299 | 10/61 | Smith et al. | 56—25.4 |
| 3,028,919 | 4/62 | Smith et al. | 56—25.4 X |
| 3,047,995 | 8/62 | Chestnut | 56—25.4 |
| 3,054,461 | 9/62 | Maguire | 172—113 X |

T. GRAHAM CARVER, *Primary Examiner.*

J. SPENCER OVERHOLSER, CARL W. ROBINSON, ARNOLD RUEGG, *Examiners.*